MAGNETIC CORE INFORMATION HANDLING SYSTEMS

Filed June 12, 1956

4 Sheets-Sheet 1

INVENTORS
ANDRE MICHEL EUGENE RICHARD et al
BY Nolte & Nolte
ATTORNEYS

INVENTORS

ANDRE MICHEL EUGENE RICHARD et al

BY Nolte & Nolte

ATTORNEYS

INVENTORS
ANDRE MICHEL EUGENE RICHARD et al
BY Nolte & Nolte
ATTORNEYS

INVENTOR.
ANDRE MICHEL EUGENE RICHARD et al
BY Nolte & Nolte
ATTORNEYS

United States Patent Office 3,206,731

Patented Sept. 14, 1965

3,206,731

MAGNETIC CORE INFORMATION HANDLING SYSTEMS

André Michel Eugene Richard, Paris, and André Pierre Jeudon and Herveline Jeudon, Gentilly, France, assignors to Societe d'Electronique et d'Atomatisme, Courbevoie, France Filed June 12, 1956, Ser. No. 590,931
Claims priority, application France, June 21, 1955, 694,249
1 Claim. (Cl. 340—174)

The present invention relates to an improved method for effecting transfers of coded informations throughout electrical circuits which make use of magnetic cores hav ing a hysteresis loop of substantially rectangular shape for temporary storage of these informations. Such magnetic cores usually are of toroidal shape and are intended in arithmetic computers working with the binary system type to insure storage and routing as well as certain logical functions, for instance union, intersection, inhibition and the like. To this end, use is made of the property of a magnetic core of this kind to present two stable states of magnetisation, corresponding to the two remanent magnetic saturations +Br and —Br. One of these states is allotted to the representation of one information value, e.g., binary digit value "1", the other state is allotted to the representation of the alternative information value, e.g., binary digit value "0".

An object of the invention is to provide a simple and efficient method for transferring an information bit from one magnetic core of the above-specified kind to at least one other magnetic core of this kind.

Another object of the invention is to provide that the control of direction of progression of the information therein does not depend from the circuit between any pair of magnetic cores.

A further object of the invention is to provide improved circuits for performing functions such as shiftable registering, one-digit and multi-digit storing, information uniting, intersecting, complementing inhibiting and the like.

According to the invention, of a bit of information from a magnetic core having a hysteresis loop of substantially rectangular shape to at least one other magnetic core having a hysteresis loop of substantially rectangular shape is transferred by reading out this bit of information from the core bearing it, temporarily only converting this read-out bit of information into an electrostatic charge, then destroying this electrostatic charge and thereby impressing the information carried therein upon the said further magnetic core or cores.

An elementary transfer circuit for the application of such a method of transferring a bit of information from one magnetic core to at least one further magnetic core, according to the invention, is mainly characterised in that the read-out winding of a first magnetic core is inserted in a closed loop including, in addition to a write-in winding of the further magnetic core, a series condenser, the first magnetic core has at least one control winding for controlling through its own current condition a read-out of the information in the first magnetic core which ensures the temporary charge of the series condenser; the further magnetic core bears at least one control winding for controlling the discharge of the condenser through its write-in winding each time a charge, if any, has been setup on the series condenser from the reading out operation of the first magnetic core.

According to the invention a series resistor inserted in the closed loop between the magnetic cores serves to damp an electrical oscillation occurring in the closed loop.

These and further features of the invention will be described with reference to the accompanying drawings wherein:

FIG. 1 represents a hysteresis cycle of substantially rectangular shape;

FIG. 2 shows a read-out circuit and FIG. 4 a write-in circuit, according to the invention;

FIG. 6 shows the combination of the circuits of FIGS. 2 and 4;

FIGS. 3, 5 and 7 are graphs illustrating, respectively, the operations of the circuits disclosed in FIGS. 2, 4 and 6;

FIG. 8 shows part of a shift register in accordance with the invention;

FIG. 9 shows control current waveforms for this register;

Figures 10, 11, 12, 13, 14, 15, 16:
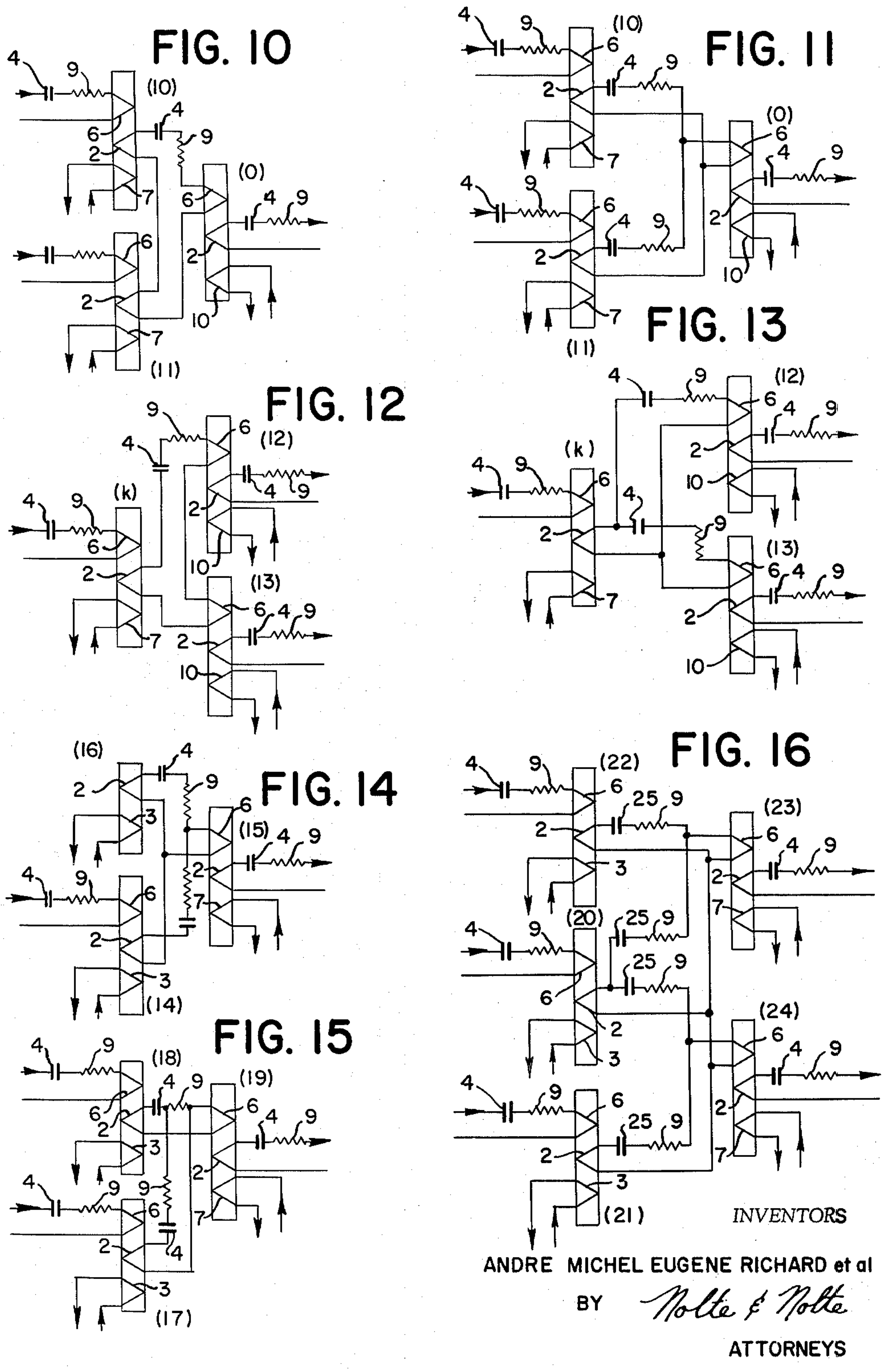
Figure 17:
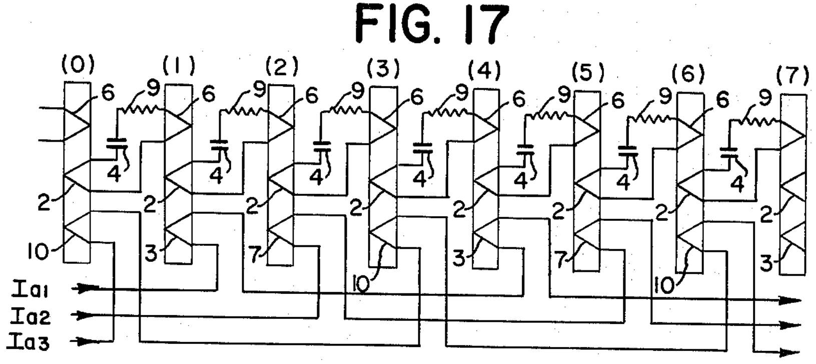
Figure 18:
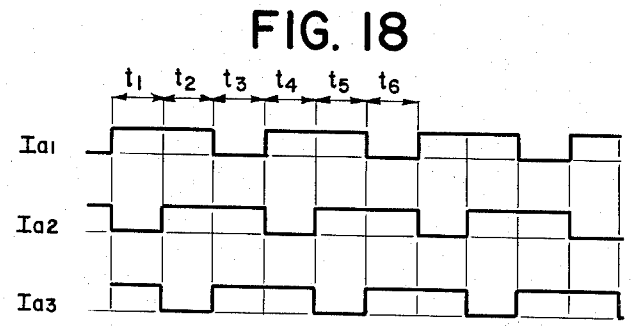
Figure 19:
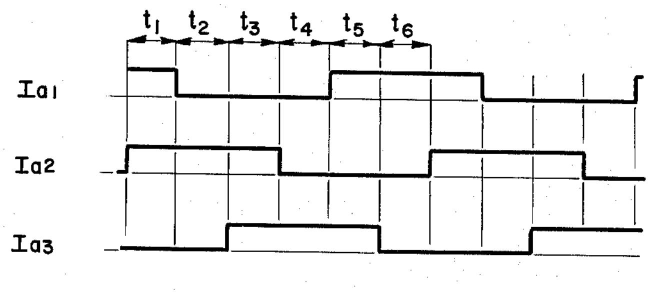

FIGS. 10 and 11 respectively show two alternatives for the input drive of the register;

FIGS. 12 and 13 show two alternatives for the derivation of the output signal from the register;

FIGS. 14 through 16 show various examples of logical circuits using the present inventions;

FIG. 17 shows part of a shift register according to the invention;

FIGS. 18 and 19 show two alternative sets of control currents for this register;

FIGS. 20 through 23 show other examples of logical circuits embodying the present invention.

Figures 1, 2, 3A, 3B, 4, 5, 6, 7, 8, 9:
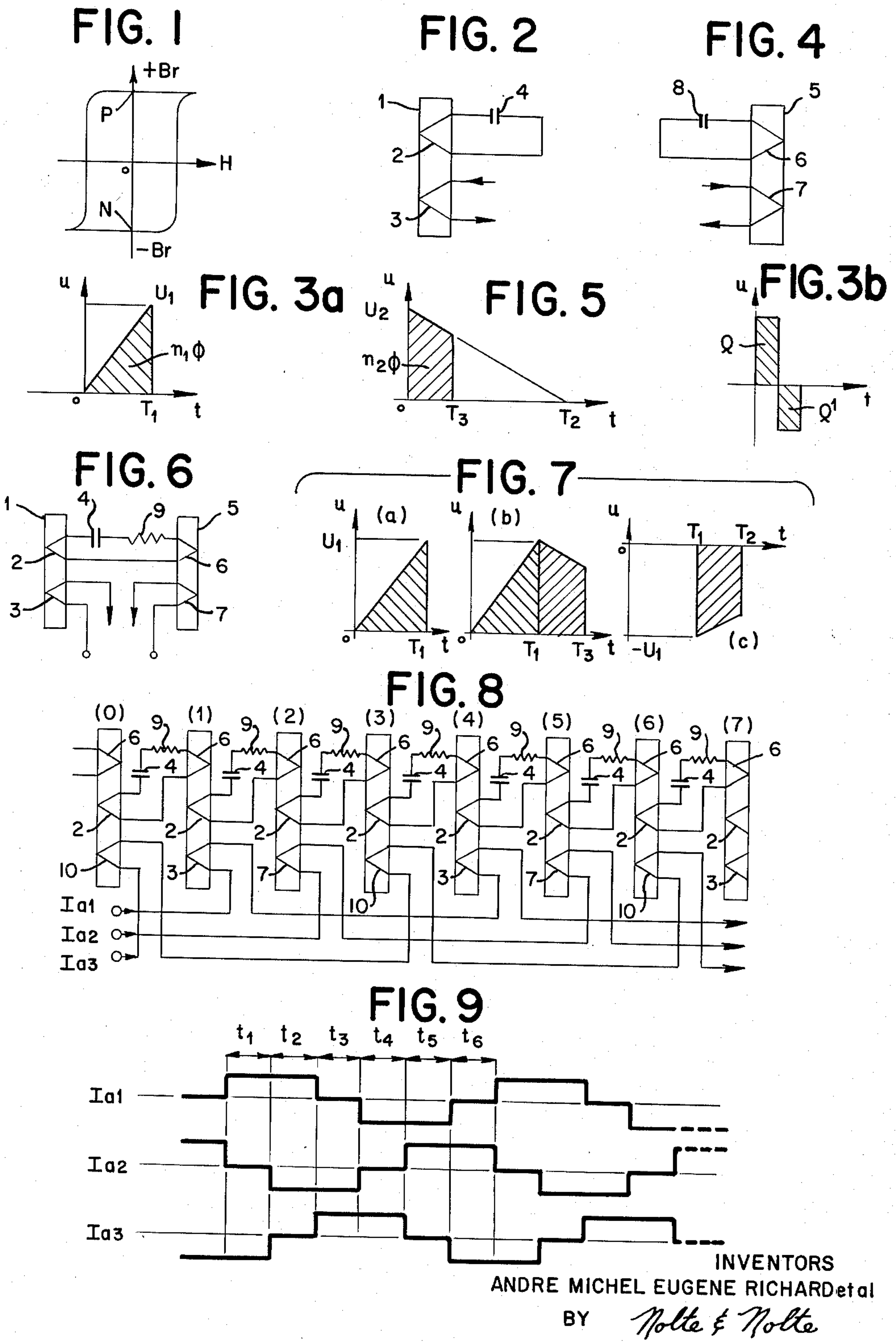

Referring to FIG. 1 illustrates in a purely qualitative way a hysteresis loop of core materials applied in accordance with the invention. Remanent magnetisation, which is of very high value, is substantially the same as saturation magnetisation for such materials, and such saturation is obtained for low values of the magnetic field H. The induction or magnetisation axis is shown as the ordinate axis from —Br to +Br, the field H is considered along the axis of the abscissae. One stable state of saturation will be P, remanent induction +Br, the other state will be N, remanent induction —Br.

In FIG. 2, a magnetic core of such a hysteresis loop, is shown at 1 and provided with an output or read-out winding 2 having $n_1$ turns of wire and with a control winding 3 having a single turn of wire. The output circuit is closed, according to the invention, by a series condenser 4. With the core at the P state, a control current $I_1$ is applied to the winding 3. $I_c$ being the coercitive current, the output winding 2 passes a current equal to $(I_1-I_c)/n_1$. The voltage across the condenser 4 is a linear function of the time, FIG. 3*a*, and the saturation occurs at point or instant $T_1$ when the voltage is:

(i) $$U_1=\frac{I_1-I_c}{n_1\cdot C}\cdot T_1$$

$$\frac{U_1\cdot T_1}{2}=n_1\cdot\phi$$

wherein $\phi$ is the flux within the core.

The maximum energy does not depend on C; nor does it depend an $n_1$. It increases, however, with $I_1$ since (ii) $$W=\tfrac{1}{2}C.U_1^2=(I_1-I_c).\phi$$

At the time instant $T_1$, the condenser will have a charge stored therein which represents the initial state of the core, thereby defining the nature of the bit of information set up on this core.

Considering now a further magnetic core 5, FIG. 4, provided with an input or write-in winding 6 and a control winding 7 adjusting this core previously to its N state, a condenser 8 which has been previously charged to the difference of potential $U_2$ is connected across input winding 6. Through this winding passes a current $I_c/n_2.I_c$ is the coercitive current and $n_2$ is the number of turns of this winding 6. The decrease of the charge of the contdenser 8 is a linear function of the time, FIG. 5. If the saturation of the core 5 to the P state were not reached during this operation, the voltage $U_2$ would become zero at the time instant $T_2$, measured from the instant of its application, and this time instant $T_2$ would be such that:

$$\text{(iii)} \qquad C.U_2=\frac{I_c}{n_2}\cdot T_2$$

and the flux variation within the core 5 would be such that it would only depend on the initial energy stored in the condenser 8 and of the value of the coercitive current. This energy is:

$$\text{(iv)} \qquad W_2=I_c.\Delta\phi$$

Normally, however, the magnetic core will be brought to saturation in the P state before the condenser is completely discharged. The voltage will then fall to zero at a time instant $T_3$, when the condenser will normally be in a short-circuited condition.

The combination of the diagrams of FIGS. 2 and 4 is shown in FIG. 6, wherein a single condenser replaces the separate condensers 4 and 8. This results in an arrangement according to the invention, for transferring the information from the core 1 to the core 5. A series resistor 9 is inserted in series with the condenser 4, for damping the oscillation which may appear when the core 5 arrives at saturation (when the transfer is made from the left to the right in the figure) or when the core 1 arrives at saturation (when transfer is made from right to the left). When such a saturation point is reached, the residual energy stored in the condenser 4 is not instantaneously dissipated but, in actual practice, this energy tends to produce an oscillatory condition in the coupling circuit, of a frequency determined by the value of the condenser and the inductance of the windings (saturated cores). The provision of the damping resistor 9 will eliminate the drawback.

Transfer from core 1 to core 5 may be summarized as follows: Core 1 being in the P state and the core 5 in the N state, the control current I applied to the winding 3 of core 1 will charge the condenser. As soon as the core 1 is saturated at the N state, time instant $T_1$, FIG. 7, winding 2 acts as a short-circuit and condenser 4 begins to discharge as its current reverses at a value $-I_c/n_2$. Since the voltage voltage across the condenser 4 does not vary instantaneously, the voltage across the winding 6 suddenly passes from 0 to $-U_1$. In FIG. 7 are shown at (*a*) the voltage variation across the winding 2 of the core 1, at (*b*) the voltage variation across the condenser 4 and at (*c*) the voltage variation across the winding 6 of the core 5.

Since the coupling circuit does not contain any unidirectionally conducting element, the reverse transfer is obtained for a reverse condition of the two cores, core 1 being at N and core 5 being at P and the transfer control current being applied to the winding 7 of the core 5.

In the presence of damping resistor 9 if an oscillation would occur, the charge of the condenser will reverse at each and any of the half-periods of their oscillation and the resulting current periodically reversing its direction, might reach the value of the coercitive current for each core. The system would then be unstable.

Actually, the only condition for obtaining an effective operation of the system is that the energy stored in the condenser during its charge causes the reversal of magnetic state of the "receiver" core. In other words, and disregarding the presence of the damping resistance 9, the system must be such that:

$$\text{(v)} \qquad I_1-I_c>I_c$$

consequently $$I>2I_c$$

Evidently, during a transfer operation, the charging current of the condenser tends to maintain the receiver core at the state N, and consequently the condenser voltage will build up as if this condenser were short-circuited by the receiver core. When the condenser discharges, on the other hand, the discharge current tends to maintain, and effectively maintain, the "transmitter" core in its N condition.

Since reversed transfers can be made between a pair of magnetic cores with the arrangement just described in accordance with the present invention, the complete arrangement of FIG. 6 can be used as a one-digit store. This of course may be achieved by the single arrangement of FIG. 2 since, as stated before, the condenser temporarily stores the information so that in order to use this arrangement as a one-digit store it suffices to apply to the control winding 3 a pair of alternate contiguous pulses, of opposite directions, see FIG. 3*b*. Considering the core 1 in its P condition and applying this double polarity pulse on control winding 3, the positive pulse remains without action it merely reinforces the existing P condition. The negative pulse on the other hand produces the charge of the condenser 4 at a value of say $-Q^1$. After having received this negative pulse the charged condenser finds its discharge circuit through the winding 2. If the stored energy has been of sufficient value, core 1 will pass to its N condition. If then a new double polarity pulse charges the condenser 4 to a value of, say, $+Q$. The magnetic core has a tendency to change its condition. The negative pulse takes back part of the condenser charge but the difference $Q-Q^1$ may easily be such that this change continues so that finally the magnetic core 1 will be brought to its P condition, and so forth.

One of the devices frequently used in an arithmetic computer is a shift register. Consequently, it is of special interest to see how the invention can be applied to provide such a register, see FIGS. 8 and 9.

In FIG. 8 there is shown a sequence of "stages" (0), (1), . . . (7), each including a magnetic core of the kind specified above. These stages are connected into a cascade since each output winding 2 of a core is serially connected to the input winding 6 of the following core through a series condenser and a series resistor, as in the elementary circuit described above. Each core is provided with an individual control winding 3 for the cores or stages (1), (4) and (7), 7 for the cores (2) and (5), 10 for the cores (0), (3) and (6). The windings 3 are serially connected and supplied with a control current $I_{a1}$, the windings 7 are serially connected and supplied with a control current $I_{a2}$ and the windings 10 are serially connected and supplied with a control current $I_{a3}$. The waveforms of these currents are shown in the graphs of FIG. 9.

These waveforms are given with the implication that, in the register of FIG. 8, the initial states or conditions of the cores are as follows: A denoting an information bit which may correspond to a N as well as to a P condition:

| Cores | (0) | (1) | (2) | (3) | (4) | (5) | (6) | (7) |
|---|---|---|---|---|---|---|---|---|
| Conditions | P | A | N | P | A | N | P | A |

During a time interval $t_1$, the control current $I_{a1}$ applied to the core (1) ensures the reading out of the information A on this core, and also of the informations on the cores (4) and (7).

For any core in which the information A corresponds to the condition N, the control impulse of current $I_{a1}$ has no action at all. The transfer is effected automatically since the next following core is at that condition N=A.

For any core controlled by $I_{a1}$ in which the information A corresponds to the condition P, this current during the time interval $t_1$ acts in such a way as to bring this core to the condition N. In this case the condensers in the coupling circuits left and right from this core will be charged. Since the control current $I_{a2}$ is zero during this time interval $t_1$, any core such as (2), (5), can be controlled for changing its primary condition. On the other hand, the current $I_{a3}$ is such during this time interval $t_1$ that no core such as (0), (5) can have its own condition varied by an external cause.

Considering for instance the core (1) in such a condition P. This core will be saturated in the N condition before the end of the current pulse $I_{a1}$ and consequently the voltage across the terminals of the windings 2 and 6 of this core will suddenly drop. The left-hand condenser then finds its circuit closed through a winding the core of which is saturated in the P condition, and this condenser discharges abruptly. The right-hand condenser 4 discharges through the winding 6 of the core (2), which changes core (2) from N to P.

At the end of the time interval $t_1$, the state of the device is:

| Cores | (0) | (1) | (2) | (3) | (4) | (5) | (6) | (7) |
|---|---|---|---|---|---|---|---|---|
| Conditions | P | N | A | P | N | A | P | N |

During the time interval $t_2$, the current $I_{a1}$ maintain cores (1), (4), (7), . . . in the N condition. Current $I_{a2}$ causes the informations to be read cores (2), (5), and the current $I_{a3}$ is such as to permit any core (0), (3), (6), to change its condition for registering the information bits A.

As to progressing the above information which from the core (1) condition P to the core (2) during the time interval $t_1$, this information will be transferred to the core (3) during the time interval $t_2$ by the mere fact that during this time interval $t_2$, core (3) will remain in condition P, because of the value of $I_{a2}$ during interval $t_2$.

If, on the other hand, the core (1) had been, at first, in the condition N, this condition would have been established on core (2) during time interval $t_2$ without any effective change of the condition of this core and, during the time interval $t_3$, the said core (2) would have been read out and the condition N applied to the core (3) by a transfer such as described above.

The same applies to any other transfer of an information bit in the register and, at the end of the time interval $t_2$, the overall condition is:

| Cores | (0) | (1) | (2) | (3) | (4) | (5) | (6) | (7) |
|---|---|---|---|---|---|---|---|---|
| Conditions | A | N | P | A | N | P | N | A |

During the following time interval $t_3$, the current $I_{a1}$ will permit any of cores (1), (4), (7) to vary its condition. Current $I_{a2}$ will disable cores (2), (5), and current $I_{a3}$ will read out cores (0), (3), (6). The same applies to time interval $t_3$, and so forth for the next following time intervals $t_4$, $t_5$, and $t_6$. The following table serves to supplement the preceding partial tables:

| Cores | (0) | (1) | (2) | (3) | (4) | (5) | (6) | (7) |
|---|---|---|---|---|---|---|---|---|
| Conditions: | | | | | | | | |
| End of $t_3$ | N | A | P | N | A | P | N | A |
| End of $t_4$ | N | P | A | N | P | A | N | P |
| End of $t_5$ | A | P | N | A | P | N | A | P |
| End of $t_6$ | P | A | N | P | A | N | P | A |

At the end of the time interval $t_6$, the initial condition of the device is re-established. Consequently, the control currents will have a period equal to six times the interval of one elementary transfer operation, which is shown in FIG. 9.

In a register such as partly disclosed in FIG. 8, the information bits may be extracted by means of special windings not shown and provided at least on some of the magnetic cores. Such extraction of information may be made in a conventional way, when required.

In such a shift register each winding such as 2 and 6 has preferably the same number of turns, say, $n$, at least from the point of view of the energetic efficiency of the device.

In order to convert such a shiftable register into a recirculating loop store, the following provisions are to be made. First, if the number of binary bits is even, for example equal to $2p$, the number of the "stages" of the register will be a multiple of $2p \times 3 = 6p$ and the loop will be straight from the last stage to the first. If the number of binary bits is odd, the number of stages will be a multiple of $6p$ plus 3 stages including a complementing stage for closing the recirculation loop. This is the result of the above process of operation. The structure of a complementing stage will be described further below.

In a shiftable register with recirculating loop, a binary code may be applied and maintained in circulation, in accordance with either FIG. 10 or FIG. 11.

In these figures, the magnetic core (10) will be considered as the core closing the recirculation loop around a register, and the magnetic core (11) will be assumed to be the core whereby new or fresh information is introduced into the register.

In FIG. 10, the output winding 2, of the cores (10) and (11) each having $n$ turns are connected in series with each other and also with the condenser 4 and the input winding 6, of $n$ turns, of the first core (0) of the register. The operative process is obvious in view of what has been stated above. Actually a signal on stage (10) cannot coexist with another signal on stage (11), and the corresponding times of introduction and recirculation will be different.

In FIG. 11, the windings 2 of the stages (10) and (11) are connected in a parallel with respect to the input winding 6 of the stage (0) of the register. Each coupling circuit includes its own condenser 4. The output windings of the stages (10) and (11) have each $n$ turns and the input winding of the stage (0) has $n/\sqrt{2}$ turns.

The arrangement of FIG. 11 represents the logical function of union. One and/or the other of the incoming signals may coexist on the inputs, and it is obvious to extend the arrangement to a union of a greater number of input signals.

FIGS. 12 and 13 represent alternative arrangements for output equipment of a recirculating register . In the arrangement of FIG. 12, the output winding 2 of the last stage ($k$) of the cascade in the register has $n$ turns and is, through the series condenser 4, serially connected with the one and the other of the input windings 6 of the bifurcation stages (12) and (13); each of the said winding 6 has $n/\sqrt{2}$ turns.

The arrangement of FIG. 13 is of a parallel type. The output winding 2 of the last stage (k) of the register has $n/\sqrt{2}$ turns and is connected through two separate transfer couplings to the windings 6 of the bifurcation stages (12) and (13); each winding 6 has $n$ turns.

In both these output arrangements, both outputs may be simultaneously activated as the case may be.

The complementing operation is automatically realized within the cascade of the register stages the signal appears in, one stage of two stages, in its complementary form. It may be necessary, however, to provide outside the register a separate circuit for complementing an information. FIG. 14 shows a such complementing arrangement. The informaiton comes from a magnetic core stage not shown; its output may be divided or bifurcated towards two separate stages, for instance in accordance with FIG. 13. One of these stages, not shown will be the first of a chain wherein the information applied thereto will progress as described above, in its "true" representation. In the other chain, the first stage of which is shown at (14), the information will progress in its "complementary" form. The next following stage (15)

of such a chain is indicated in FIG. 14. Stage (15) receives on its input winding 6, of $n/\sqrt{2}$ turns, the signal issuing from the stage (14), winding 2 of $n$ turns, the signal is opposed to the signal issuing from the output winding 2 of $n$ turns of an auxiliary stage (16). The signal issuing from (16) always represents the figure "1," and stage (16) is so mounted as to always trigger in this direction simultaneously with the control progression of the stage (14). When stage (14) delivers an information representing "1," the signal "1" issuing from stage (16) is opposed and consequently the stage (15) will receive the figure "0." On the other hand when the stage (14) delivers a figure "0," the stage (16) will deliver a figure "1" and the receiver stage (15) will take figure "1" as the value of the new information bit. It should be noted that the opposition is not fully realised so that the stage (15) may first partially swing with respect to figure "1" coming from (14) but this can easily be prevented by providing for the stage (15) a stronger control signal than occurs in a register stage.

An inhibition operation is obtained when, in the complementation process the inhibitor signal from (16) cannot occur alone, viz. without an existing signal issuing from (14). FIG. 15 shows such an inhibitor arrangement. Stage (17) is the normal stage for transferring a signal to the receiver stage (19). Stage (18) is the inhibitor stage and is activated by the inhibition signal only when the normal signal does exist. If the inhibition signal would appear alone, this signal would at least partially trigger the stage (19) and consequently the resetting of this stage would only be partial unless a much stronger control signal is provided for the control current of this stage (19).

An operation of intersection may be obtained from the union of complements of the signals to be intersected. No diagram is necessary because this is obvious from the above description of the complementation and union arrangements.

From the arrangement illustrated in FIG. 16, it may be noted that when the same signal is to be introduced in two separate logical operations, the bifurcation thereof may be combined with either of these operations. For instance, on the one hand the signal issuing from (20) must be combined with the signal issuing from (22) and on the other hand the second part with signals issuing from (21). The signal from (20) and (22) are consequently routed jointly to the inputs of both stages (23) in union with the signal from (22) and to the input of the stage (24) in union with the signal from (21), but the two transfer circuits are separate. In such circuits, the capacity of each of the condensers 25 is established at half the value of the capacity necessary for a simple transfer between two stages. This will also be the case for the condensers of the circuits of stage (21) and (22) if these stages belong to other bifurcation arrangements.

Referring to the shiftable register of FIG. 17, and to the operation of the register of FIG. 8, which is similar it may be desirable to know at any time where in the register the information bits are to be found. This apparently is not the case from the register previously described because in the cascade of cores there always are two consecutive cores in N (or in the P) condition. As apparent from FIGS. 18 and 19 the control currents are changed permitting the operation of a register wherein all the cores which do not bear an information bit are, simultaneously and at any instant, in one of the predetermined states N and P. Consequently a test of the conditions of the cores will result in the discrimination of the information bits since at least one of the cores will be in a condition, N or P, denoting "1," different from the overall predetermined condition, P or N, affecting all register cores which, at this time instant, do not bear any information bit.

For illustrations sake, it will be assumed that, when no information is contained in the register, all the cores are in their P condition.

The starting overall condition will be taken similar to that considered for the first example of FIG. 8, viz:

| Cores | (0) | (1) | (2) | (3) | (4) | (5) | (6) | (7) |
|---|---|---|---|---|---|---|---|---|
| Conditions | P | A | P | P | A | P | P | A |

Two sets of control currents are shown in FIGS. 18 and 19, respectively. In both these sets, each control current has a rectangular wave-form. The lower level is supposed to correspond to no action at all upon the core to which the current is applied the higher level is supposed to correspond to the following action: If the core is in its N condition, this core is triggered back to its P condition, if the core is in P condition, this core is maintained in that P condition.

When the control currents of FIG. 18 are used in the arrangement of FIG. 17, during the time interval $t_1$ only the cores such as (2), (5) can vary their condition, if necessary, according to the control current $I_{a2}$, cores (0), (3), (6) will be maintained in their P condition from control current $I_{a3}$. Cores (1), (4) and (7) may change their conditions according to the kind of the bits of information previously applied thereto, and consequently will drive the cores (2), (5) when such a change occurs. If for instance the core (1) was in its N condition, this core is brought back to the P condition during the time interval $t_1$ and, by the transfer action, described controls, the core (2) to its N condition. If core (1) was in the P condition, no action occurs, and the core (2) remains in the P condition, while the transfer is being effected as explained above.

During the time interval $t_2$, only the cores receiving the control current $I_{a3}$ may change their condition in accordance with the casual changes of the cores next preceding in the chain, controlled by the current $I_{a2}$. All cores which receive the control current $I_{a1}$ are maintained at P.

Finally, the progression of informations in the register of FIG. 17 controlled by the set of control currents of FIG. 18 may be stated as followed:

| Cores | (0) | (1) | (2) | (3) | (4) | (5) | (6) | (7) |
|---|---|---|---|---|---|---|---|---|
| Conditions: | | | | | | | | |
| Initial | P | A | P | P | A | P | P | A |
| End of $t^1$ | P | P | A | P | P | A | P | P |
| End of $t^2$ | A | P | P | A | P | P | A | P |
| End of $t^3$ | P | A | P | P | A | P | P | A |

At the end of $t_3$, the overall condition of the register is brought back to the initial or starting condition. Each bit of information has progressed by one step, i.e., three cores. The period of the control currents is equal to three times the time interval of one transfer i.e., the interval during which any bit is progressing by one core in each transfer.

The conversion of such a register into a recirculating loop store does not involve any count of parity of the number of bits in the informations to be handled, the loop may be closed through any multiple, odd or even, of three stages.

In practice however, certain difficulties may arise in such a system due to the necessity of calibrating the control currents which for a reliable operation must be apt to strongly maintain or read the cores. In case for instance the consumption of overall current is limited in a certain fashion outside the circuits proper, this drawback may be overcome by means of a set of control currents such as shown in FIG. 19, involving a much lower consumption, and also a lesser degree of current calibration.

In order to explain the operation of the register with the control currents of FIG. 19, the following initial condition will be assumed:

| Cores | (0) | (1) | (2) | (3) | (4) | (5) | (6) | (7) |
|---|---|---|---|---|---|---|---|---|
| Conditions | P | P | A | P | P | A | P | P |

During time interval $t_1$, control current $I_{a3}$ is at its lower level, the other two control currents are at their higher level condition. Current $I_{a2}$ reads out cores (2), (5), but the action is slow when one of these cores is in its N condition so that, at the end of $t_1$ the change of condition is not fully realised nor is the transfer completed to the next following core of the cascade. Only during time interval $t_2$ the information transfer will be completed, only control current $I_{a2}$ being active. During the time interval $t_3$, control current $I_{a2}$ will be maintained for blocking cores such as (2) in P condition while current $I_{a3}$ controls the transfers in a similar way. From the time interval $t_5$ transfer control will be passed on to $I_{a1}$, and this new transfer will only be completed at the end of $t_6$; and so forth. The following table gives the sequence of such an operation:

| Cores | (0) | (1) | (2) | (3) | (4) | (5) | (6) | (7) |
|---|---|---|---|---|---|---|---|---|
| Conditions: | | | | | | | | |
| Initial | P | P | A | P | P | A | P | P |
| End of $t_1$ | P | P | A | P | P | A | P | P |
| End of $t_2$ | A | P | P | A | P | P | A | P |
| End of $t_3$ | A | P | P | A | P | P | A | P |
| End of $t_4$ | P | A | P | P | A | P | P | A |
| End of $t_5$ | P | A | P | P | A | P | P | A |
| End of $t_6$ | P | P | A | P | P | A | P | P |

The periods of the control currents is equal to six times an elementary time interval, but actually three times only the interval necessary for a single transfer. Each of the control currents, which are respectively interlaced in the time, successively ensures preparation, execution and confirmation of a transfer. During the confirmation period no transfer occurs. From this point the safety of operation may be regarded as improved, over the operation ensured by the control current set of FIG. 18.

With a further view of an increasing efficiency and security of operation the logical networks shown and described herein may be modified as follows:

(a) Every winding having a number of turns different from the standard number of turns $n$, is divided into separate windings each of that same number of turns $n$;

(b) Particular consideration has been given to the "receiver" and "transmitter" stages of such logical circuits.

As an example, these changes are embodied in FIGS. 20 to 24, showing modified versions of the networks of FIG. 11, to 15 respectively.

Figure 20:
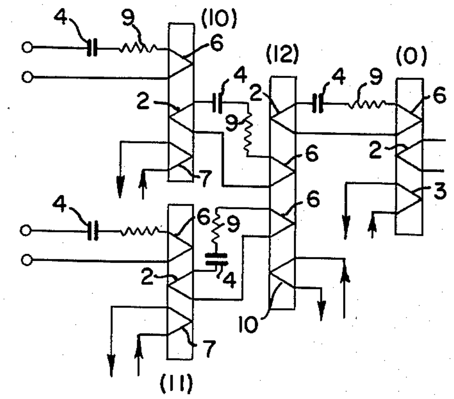

FIG. 20 shows a union circuit of two signals, say $a$ and $b$, the information bits of which respectively appear upon the cores (10) and (11) at a recurrency rate of three elementary time intervals. Output windings 2 of these cores (10) and (11) are connected respectively through separate circuits 4–9 to two separate input windings 6 of the receiver core (12). Core (12) thus issues a composite signal to be transferred to a "normal" stage (0), and this signal represents "$a$ and/or $b$."

Figure 21:
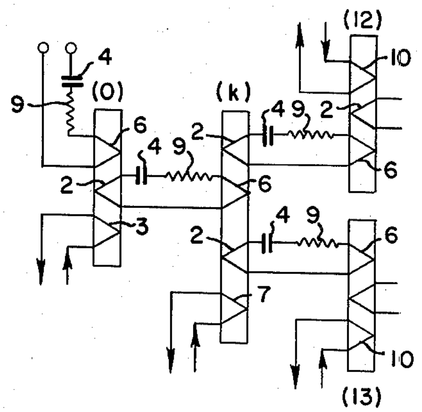

FIG. 21 shows the arrangement of a bifurcation circuit for a signal $a$ which has to be routed into channels of which cores (12) and (13) represent the first stages. The input windings 6 of these stages are connected respectively to separate output windings 2 of core ($k$). This operation is prepared in the next preceding stage (0).

Figure 22:
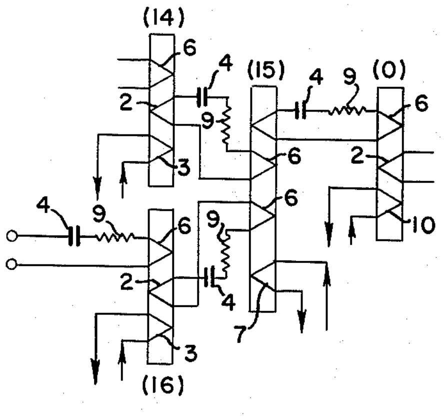

FIG. 22 shows a complementation network. Stage (16) always receives the figure "1" and at each step delivers this figure "1" in proper phase with the information bit arriving at stage (14), to one input winding of stage (15). Another input winding of stage 15 receives the information bit from stage (14). The output winding of stage (15) delivers the signal $\bar{a}$ (to be read non-$\bar{a}$) for the first normal transfer stage (0).

Figure 23:
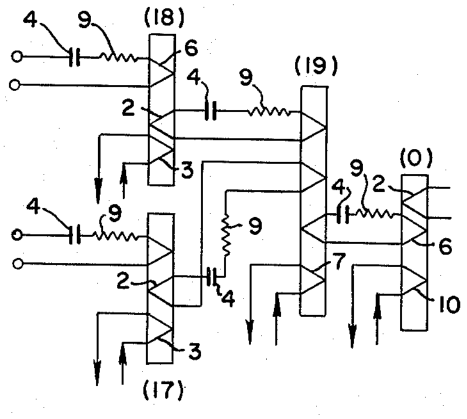

FIG. 23 shows an inhibition network. The stage (18) receives an information signal $b$ in proper phase with the information signal $a$ core (17). From a mixer stage (19), the network delivers $\bar{a}.b$. This signal is used in the first normal transfer stage (0).

In both FIGS. 22 and 23, the complementary signal is obtained by reversing the connections in the appropriate coupling circuit.

It will be noted here that from these simple logical networks, if desired other functions may be obtained. For instance, a mere reversal of the data permits to derive from an inhibition network of the signal $a.\bar{b}$ as well as signal $\bar{a}.b$. A union network for these two signals, gives the signal $a.\bar{b}+\bar{a}.b$ which, as well known, represents the result of the logical operation "Exclusive OR." It is apparent that with the above described diagram such a circuit will only contain five magnetic cores.

Similarly, an "AND" operation may be obtained by considering that the logical product $a.b.$ is supplied by the operation $a.\bar{\bar{b}}$. For instance, a network complementing $b$ will issue signal $\bar{b}$. A further network inhibiting the transmission of the signal $a$ by signal $\bar{b}$, as above by the signal $b$, will give the required result.

In another way, as well known the logical product $a.b.$ may also be written $a.(\overline{a.\bar{b}})$. Consequently an inhibition circuit is arranged to give $a.\bar{b}$, the signal $a$ being simultaneously bifurcated to another stage, and in a further stage, the result of the inhiibtion of $a$ by $a.\bar{b}$ is formed. The signal issuing therefrom will represent $a.b.$ These and other combinations, which may be obviously varied according to any required Bollean formula, may be obtained by the operation of the elementary networks of FIGS. 20 to 23.

Referring to FIG. 20, $n$ denotes the number of turns of windings 6 and 2 on cores (10) and (11) and also the number of turns of the winding 2 on the receiver core (0). $n'$ denotes the number of turns of winding 6 of core (0) $n''$ the number of turns of each of windings 6 on the core (12), and $n'''$ the number of turns of winding 2 on core (12).

In the following, the number of turns $n$ will be called the "normal" number, for every winding such as 2 and 6. In this case, the number of turns $n_a$ of the control windings is uniform throughout the chain and is also a normal" number. If, for instance, $n=100$, $n_a$ may be made equal to 150.

In the network of FIG. 20, this number of turns $n_a$ is preserved for the control windings of the stage (0) and, preferably, $n'$ will be made equal to $n$. At least one of the control windings, 7 for the pair of stages (10), (11) or 10 for the stage (12) and preferably all these control windings will be made with a number of turns equal to $n'_a$ higher than $n_a$ and with a ratio $n'_a/n_a$ at least equal to 4/3 provided $n''=n'''=n$ in the network. If, for instance, $n=100$ and $n_a=150$, $n'_a$ may be between 200 and 250 turns.

If $n'''$ is made higher than $n''$, the number $n_a$ may be preserved for the control winding 10 but the control windings 7 must be made of a number of turns $n''_a$ such that the ratio $n''_a/n_a$ is at least equal to 5/3. If, for instance, $n'''$ equals 140 and $n''$ equals 100 equals $n$, each of the windings 7 may be made of a number of turns equal to 250 and the winding 10, of a number of turns equal to $150=n_a$.

It is however preferred to maintain the number of turns of the windings 2 and 6 uniform throughout a network.

Similar considerations may be applied to the circuits shown in FIGS. 22 and 23. Preferably, any winding 10 in these figures will be made of $n'_a$ turns as defined above and any winding 3 or 7 will be made of $n''_a$ turns, each of the other windings having $n$ turns.

Concerning the bifurcation network of FIG. 21, the practice has proved sound to maintain the windings in each of such stages such as (12) and (13) at "normal" numbers of turns. Control windings 3 of the stage (0) and 7 of the stage $(k)$ are provided with $n'''_a$ turns, with a ratio $n'''_a/n_a$ at least equal to 4/3. Good results however have also been obtained with a "normal" stage (0) when, in the stage $(k)$, winding 7 was made of $n'''_a$ turns, the two windings 2 of $n$ turns each and the number of turns of the winding 6 being substantially increased. From another point of view, improvement may also be obtained by varying value of the resistance 9 of the coupling circuit between the stages (0) and $(k)$, i.e., reducing that value of the resistance with respect to the value of the other resistances 9 of the network.

These considerations, specially those referring to the control windings, are also valuable for any other logical network without departing from the scope of the invention.

We claim:

In combination, a plurality of magnetic cores each having a hysteresis loop of substantially rectangular shape, input, output and control windings on each of said cores, a plurality of closed circuit loops each including a serial ungrounded interconnection between an input winding of one core of said plurality and an output winding of a second core of said plurality, a series condenser in each of said interconnections receiving its charge from at least one output winding only and under control of control windings associated with said first and second cores, and discharging through said input winding of another core under control of a control winding associated with said other core and at least three series paths of control currents, each path including in serial connection one-third of said plurality of control windings regularly interlaced within the sequence of cores derived from said interconnections of input and output windings, each of said interconnections also including a series resistance, all of the windings having the same number of turns, and the series condensers and resistance being of uniform values, respectively.

References Cited by the Examiner

UNITED STATES PATENTS

| | | | |
|---|---|---|---|
| 2,654,080 | 9/53 | Browne | 340—174 |
| 2,708,722 | 5/55 | An Wang | 340—174 |
| 2,785,390 | 3/57 | Rajchman | 340—174 |
| 2,847,659 | 8/58 | Kaiser | 340—174 |

OTHER REFERENCES

Pages 291–298, March 1955, Publication I, an article entitled: "Logical and Control Functions Performed with Magnetic Cores," by S. Guterman et al., published in "Proceedings of the IRE."

Pages 223–229, May 1952, Publication II, an article entitled: "Magnetic Binaries in the Logical Design of Information Handling Machines," by N. B. Saunders, published in "Proceedings of Association for Computing Machines."

IRVING L. SRAGOW, *Primary Examiner.*

EVERETT R. REYNOLDS, *Examiner.*